United States Patent [19]

Schopper et al.

[11] 4,332,423

[45] Jun. 1, 1982

[54] TWO-CIRCUIT PRESSURE CONTROL UNIT

[75] Inventors: Bernd Schopper, Frankfurt am Main; Peter Tandler, Falkenstein, both of Fed. Rep. of Germany

[73] Assignee: ITT Industries, Inc., New York, N.Y.

[21] Appl. No.: 160,523

[22] Filed: Jun. 18, 1980

[30] Foreign Application Priority Data

Jul. 6, 1979 [DE] Fed. Rep. of Germany ....... 2927423

[51] Int. Cl.$^3$ ............................ B60T 8/02; B60T 8/18
[52] U.S. Cl. .................................. 303/22 R; 188/195
[58] Field of Search .................. 303/22 R, 22 A, 6 C, 303/6 R, 84 A, 84 R; 188/195, 349; 308/72

[56] References Cited

U.S. PATENT DOCUMENTS 3,731,981  5/1973  Bueler ............................... 303/22 R
4,101,176  7/1978  Carré et al. .................... 303/22 R X

FOREIGN PATENT DOCUMENTS 2600813  7/1976  Fed. Rep. of Germany .... 303/22 R
2706785  9/1977  Fed. Rep. of Germany .
1531803  11/1978  United Kingdom .

Primary Examiner—Douglas C. Butler
Attorney, Agent, or Firm—John T. O'Halloran; Alfred C. Hill

[57] ABSTRACT

Twin brake force control units, for a two circuit brake system are known in which the initial control force is changeable dependent on the vehicle load. The control force is distributed to the control pistons by a lever. Due to tolerances and erosion of the individual elements considerable differences in pressure in both brake circuits may occur. This is overcome according to the present invention by providing a lever which directly operates upon both control pistons and which is rotatable about an axis perpendicular to the shifting movement of the control pistons and which is additionally rotatable about its longitudinal axis. This double rotation of the lever is accomplished by supporting the lever in a spherical joint.

36 Claims, 18 Drawing Figures

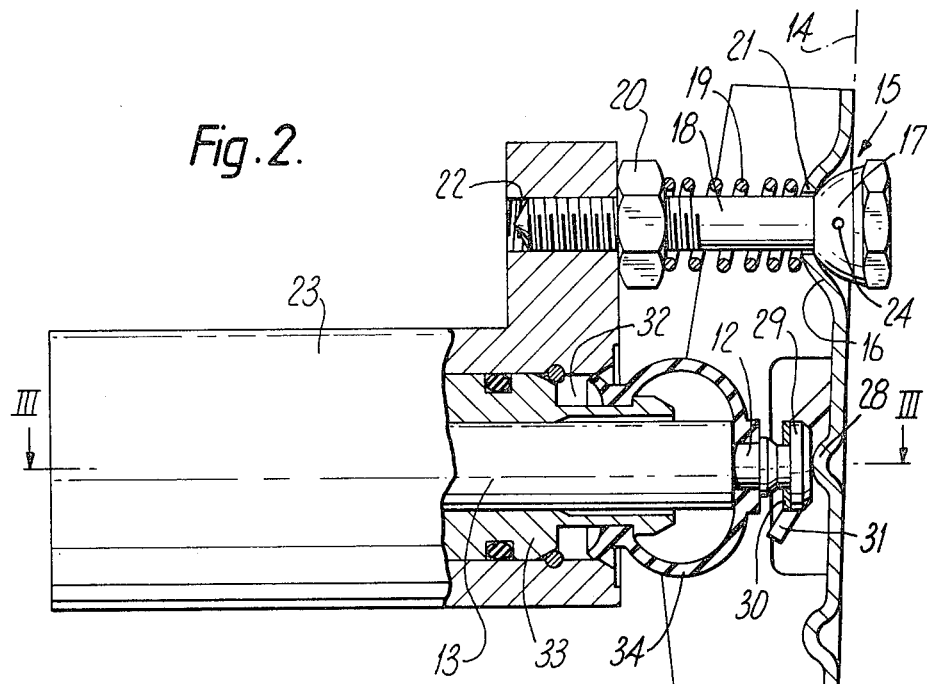
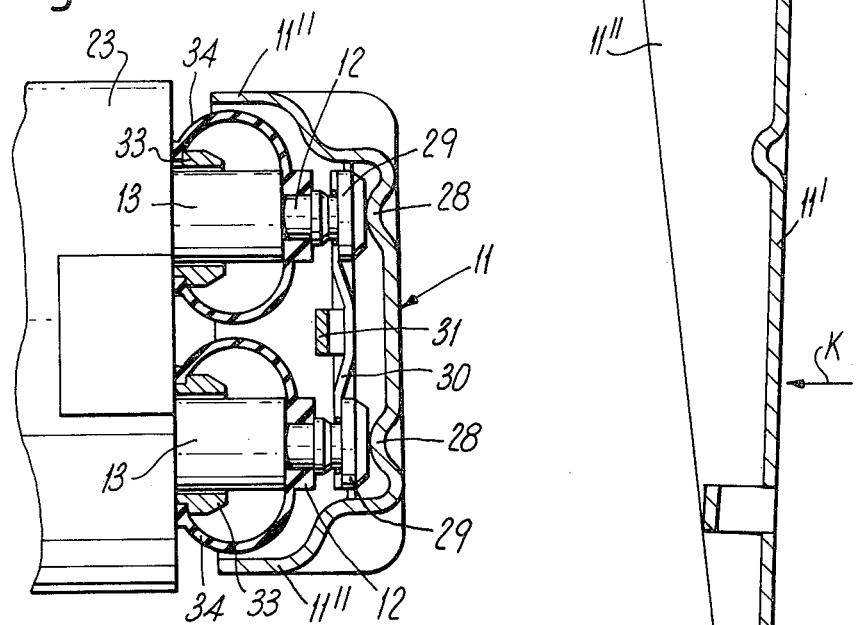

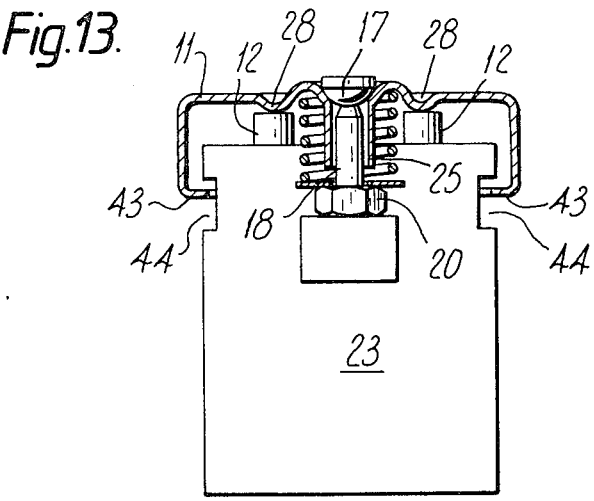
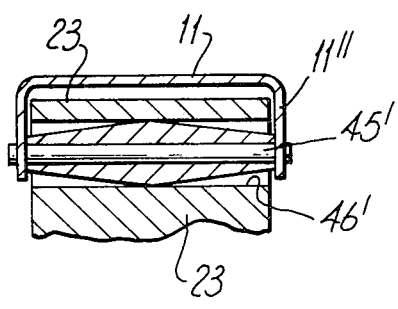
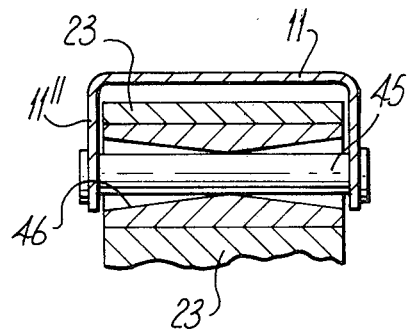

TWO-CIRCUIT PRESSURE CONTROL UNIT

BACKGROUND OF THE INVENTION

The present invention relates to a twin two-circuit pressure control unit with a change-over point which is adjustable from the outside. The pressure control unit serves motor vehicle dual hydraulic brake systems and has two cylinders, each of which are connections in a different one of the two brake circuits. The two cylinders are arranged parallel with respect to each other, and house the control pistons whose actuating pins project outwards from the same end of the cylinders and are acted upon by a common control lever. This control lever, is acted upon by a control force and which at the housing is supported tiltable around an axis which runs vertically with respect to the axis of the cylinders which means being provided for an even distribution of the control force to the two control pistons.

A two-circuit pressure control unit of this type is known from British Pat. No. 1,531,803 wherein, via the actuating pins, the control lever pushes the two control pistons into an end position in which the valves provided in the pistons are open. Above the change-over point defined by the piston surfaces and the force at the control lever, the control pistons will move outwards, forcing the control lever backwards, whereupon the valves provided in the control pistons will close, the pressure in the outlet chambers remaining unchanged. Thus, this known twin arrangement is a pressure limiter.

As the control force at the control lever increases the change-over point of the twin braking force control unit will change over to ever increasing pressures. This effect may e.g. be utilized for the purpose of increasing the control pressure in correspondence with the load of the vehicle and of thus increasing the braking pressures in the wheel cylinders in correspondence with the load. In the known braking force control unit the lever which is movable dependent on the state of loading is tiltable supported at the control unit housing by means of a pivot bearing. At the lever, a force transmission element is fixed which acts upon the control pistons and whose elastic design enables it, up to a certain extent, to permit an even pressurization of the two control pistons. The force transmission element connected between the actuating pins of the control pistons and the lever of the known prior art, however, is complicated as far as its manufacture is concerned and even implies additional tolerances and adjusting problems. As far as mass production is concerned, it is a disadvantage that assembly and positioning of the force transmission element at the lever require several operations which involve a lot of time.

Additionally, a pressure control unit is known which operates with but one stepped piston (German Patent DE-OS No. 2,706,785) wherein the control lever which it tiltable around a lateral axis acts on a single control piston.

SUMMARY OF THE INVENTION

It is an object of the present invention to provide a two-circuit pressure control unit of the type referred to above which safeguards an even distribution of the control force to both control pistons without any complicated force transmission elements in a simple, yet reliable manner. The control unit shall further permit easy manufacture and easy assembly without any tolerance and adjusting problems.

A feature of the present invention is the provision of a two-circuit pressure control unit having a changeover point which is externally adjusted employed in a two-circuit hydraulic brake system comprising: a housing containing two blind end bores having parallel longitudinal axes, each of the bores containing therein a control piston having an actuating pin projecting therefrom out of an associated one of the bores, each of the control pistons being associated with a different one of the two brake circuits; and a common control lever having a control force acting on one end thereof directly acting on both of the actuating pins for even distribution of the control force to the control pistons, the control lever being supported by the housing to enable tilting thereof about a first axis corresponding to its longitudinal axis and a second axis perpendicular to the first axis.

In this way, a true three-point bearing will be achieved between the hinge point and the two supports at the actuating pins of the control pistons. This three-point bearing always ensures the desired even distribution of the control force to the two pistons independently of the different axial movements of the control pistons. All points of application of force are advantageously defined at the control lever itself. With regard to manufacture, the foregoing on its part has the advantage that all points of application of force may be produced in one single operation at the very same component by using but one tool. This will make adjustments superfluous when assembling the control unit and will reduce any inaccuracies of the control unit caused by tolerances.

It will be particularly advantageous if the lever's end area which is spaced from the actuating arm is supported in a spherical joint. Thus, it will be possible for the two tilting movements to be carried out at the very same spot around axes which meet each other vertically.

A practical embodiment is characterized in that a spherical calotte-like recess is pressed from the outside into the lever made from sheet metal, the recess having a central bore through which a bolt will be passed from the outside and secured at the housing, the bolt having a head with a complementary design with respect to the recess. The bore in the recess has to be of a size which will be sufficient to ensure that the bolt penetrating the bore will have sufficient play without jamming when the tilting movements happen.

Expediently the bolt will be screwed into the housing and secured by means of a lock nut at the housing against twisting, with the bolt surrounded by a helical spring having one end supported at the lever and the other end supported at the housing or the lock nut. In this way the control lever will be pressed with prestress against the spherical surfaces of the head of the bolt.

If one of the brake circuits fail, the corresponding control piston will remain in its rest position, and the control lever will adopt an inclined position. In this case the force distribution to the two control pistons would be kept up, irrespective of the fact that now a higher braking pressure is present in the intact brake circuit. In order to achieve this, a preferred embodiment of the invention provides stop means between the lever and components which are fixed to the housing, the stop means limiting the tilting movement of the lever around its longitudinal axis without obstructing the tilting movement around its lateral axis. In this arrangement, the stop means is preferably provided in the area of the spherical joint so as to provide the spherical joint with but a limited tilting area. As soon as the control lever reaches the end of the tilting area during its tilting around the longitudinal axis, which may happen upon the failure of one brake circuit where the associated control piston stands still, any further tilting around the longitudinal axis will be prevented which results in the remaining control piston being acted upon by twice the control force, the load not having changed. As a consequence thereof, the change-over point will go up correspondingly. Due to the inventive measure, at least an increase of the change-over point up to twice the value of the pressure will be achieved. Also the pressure control valve of the intact brake circuit will be kept permanently in its open position upon failure of the other brake circuit.

According to another feature of the present invention the means for limiting the tilting movement of the control lever around its longitudinal axis is incorporated as a part of the lever itself so as to enable them to be manufactured together with the lever in one operation. According to a practical embodiment this can be achieved by providing a shaft at the lever encircling the spherical joint, which with respect to the bolt to which the spherical joint is attached is spaced a distance from the spherical joint which increases conically. After the predetermined tilting movement the shaft will abut the bolt and will thus terminate any further tilting movement of the control lever.

According to a first embodiment the shaft may be realized by being pressed out of the material originally present in the lever bore. Thus the shaft will be manufactured together with the lever in one operation. However, it is also possible that a fitting piece containing the recess and the shaft is inserted in an opening of the lever.

In order to achieve a faultless force transmission from the control lever to the actuating pins of the control pistons even if their depths of penetration into the cylinders are different, there is expediently provided on the level of the actuating pins two dents side by side at the lever which will abut the adjacent ends of the actuating pins. In order to keep the actuating pins in permanent abutment with the lever from the inside, according to another embodiment, the actuating pins have grooves engaged by a common retaining spring which supports itself at the lever. The spring will ensure that the guidance of the lever will be kept up and that the lever will remain in permanent contact with the ends of the actuating pins. To this end, a tab may be punched out of the lever to grip the retaining spring.

In constructional terms, it will be especially expedient for the lever to have essentially a U-shaped cross-section, its sides covering those components of the control unit which are protruding from the cylinder. This arrangement has advantages as far as stability is concerned and will further contribute to the protection of the components of the control unit against outside influences.

Remote from the spherical joint of the lever there is disposed at the housing a guiding pin. The guiding pin is preferably threaded, penetrates an elongated hole disposed in the lever and runs in the longitudinal direction of the lever. The guiding pin has a stop head so as to ensure that the lever will be fixed with respect to the alignment of its longitudinal axis and will be limited with regard to its tilting area around its lateral axis.

In this arrangement, preferably the guiding pin has an annular groove positioned at a distance with respect to the stop head and the lever has a shaft-like sleeve at its elongated hole on the side thereof spaced from the housing. The sleeve encloses the guiding pin and engages the annular groove upon a tilting of the lever around its longitudinal axis so as to cause the lever to be locked in its end position lying in the direction of the control force to prevent a tilting around its lateral axis. Thus, upon failure of one brake circuit, the pressure control valve of the intact brake circuit will be kept permanently in its open position.

Alternatively or additionally the lever may be provided longitudinally therealong with lateral hooks arranged in an offset manner relative to the spherical joint, such that upon a tilting of the lever around its longitudinal axis the hooks engage clearances or grooves arranged at the housing so as to again ensure that the lever will be locked in its end position lying in the direction of the control force to prevent a tilting around its lateral axis.

In order to support the control lever tiltably around its longitudinally axis, it is possible to provide the lever with an articulated axle at its end area spaced from the actuating arm instead of providing a spherical joint, the articulated axle running parallel to the lateral axis of the lever and being supported in a double conical bore of the housing, the bore expanding towards its ends.

Instead of this arrangement, it is also possible for the lever to have a double conical articulated axle at its end area spaced from the actuating arm, the articulated axle tapering towards its ends and being supported in a bore of the housing, the diameter of the bore being essentially constant.

In the spherical joint described above, it is possible to arrange a plate on the head of the bolt at a distance with respect to the lever, the plate limiting a tilting of the lever around its longitudinal axis. Additionally, in this arrangement, the lever may have a rim encompassing the plate, a distance being kept with respect to the plate. Thus, the plate may cooperate both with the top surface of the lever and with the bent rim. The plate may be stiff or made of a resilient material.

BRIEF DESCRIPTION OF THE DRAWINGS

Above-mentioned and other features and objects of this invention will become more apparent by reference to the following description taken in conjunction with the accompanying drawing, in which:

FIG. 2 is an enlarged side view partial in cross section of the pressure control unit of FIG. 1;

FIG. 3 is a partial cross sectional view taken along line III—III in FIG. 2;

FIG. 13 is a partial cross sectional view, similar to FIG. 3, illustrating a modification thereof;

FIG. 14 is a partial cross sectional view of a modification of the lever joint with a double conical articulated axle;

FIG. 15 is a partial cross sectional view corresponding to FIG. 14, the joint having a double conical bore;

DESCRIPTION OF THE PREFERRED EMBODIMENTS

Figure 1:
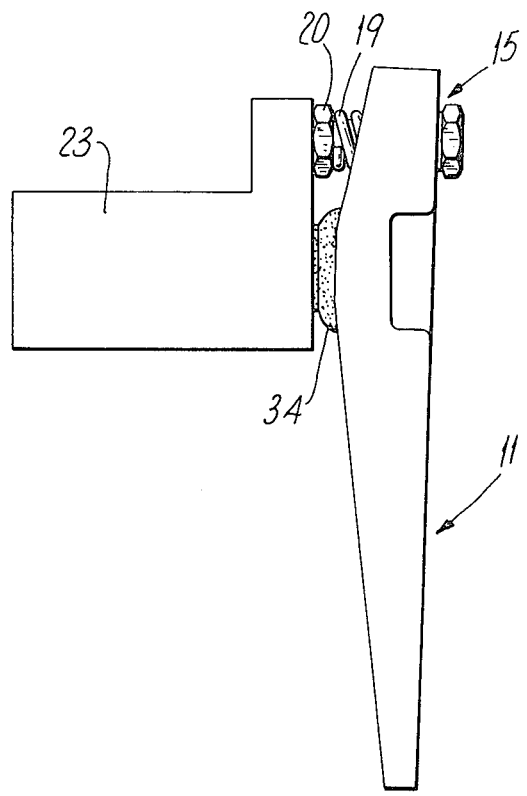
FIG. 1 is a side view of a two-circuit pressure control unit in accordance with the principles of the present invention.
Figure 5:
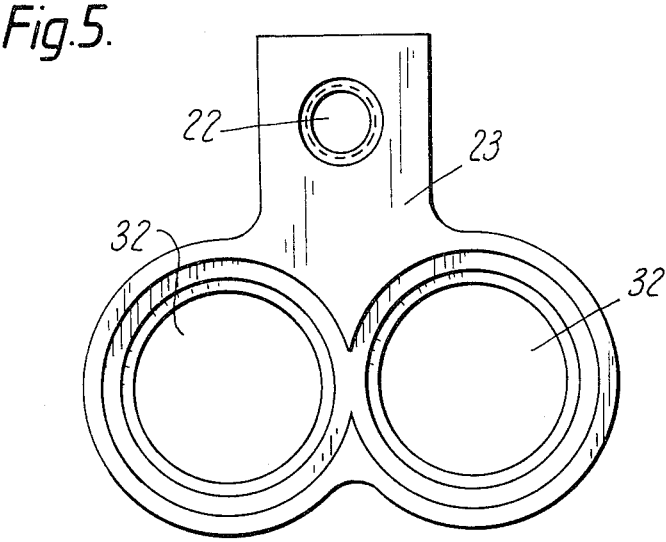
FIG. 5 is a front view of the housing of the inventive two-circuit pressure control unit of FIG. 2.

FIGS. 1, 2 and 5 are schematical representations of the housing 23 of a two-circuit pressure control unit. Housing 23 comprises two blind end bores or cylinders 32 with parallel axes. Each of the cylinders 32 contains a bushing 33 which houses the actual control piston 13. Each control piston 13 contains a non-illustrated on-off valve which will be open if control piston 13 is pressed in. In this state each of the valves will connect a non-illustrated inlet connection with a non-illustrated outlet connection of a brake circuit. Upon surpassing a certain pressure in the outlet circuit, control piston 13 in FIG. 2 will move to the right.

Between the end of bushing 33 and the adjacent end of control piston 13, a sealing collar 34 is provided which seals the space between housing 23 and bushing 33 against the outside.

According to FIGS. 2 and 3, at the end of control pistons 13, adjacent sealing collar 34 actuating pins 12 are provided. Actuating pins 12 each have annular grooves provided at their heads 29.

According to FIGS. 2 and 3, dents 28 of a control lever 11 are abutting the two heads 29 of actuating pins 12. One end of control lever 11 is acted upon by a control force K in the direction of the axis of control pistons 13. At the other end of control lever 11, which is beyond dents 28, control lever 11 is supported in a spherical joint 15 secured to housing 23. In detail, spherical joint 15 comprises an approximately spherical calotte-like recess 16 in the sheet metal of lever 11. Recess 16 has a central bore 21 through which bolt 18 extends with play on all sides, head 17 of bolt 18 having a spherical shape which is complementary to recess 16. Bolt 18 has a thread at its housing side end and is screwed into a bore 22 of housing 23. A lock nut 20 secures bolt 18 against twisting. Between lock nut 20 and recess 16, a helical compression spring 19 extends which surrounds screw bolt 18 and which keeps the upper end of control lever 11 (cf. FIG. 2) in abutment with spherical surface 17.

Due to the support of control lever 11 in spherical joint 15, lever 11 may be tilted in a certain area around both its lateral axis 24 and its longitudinal axis 14.

Figure 6:
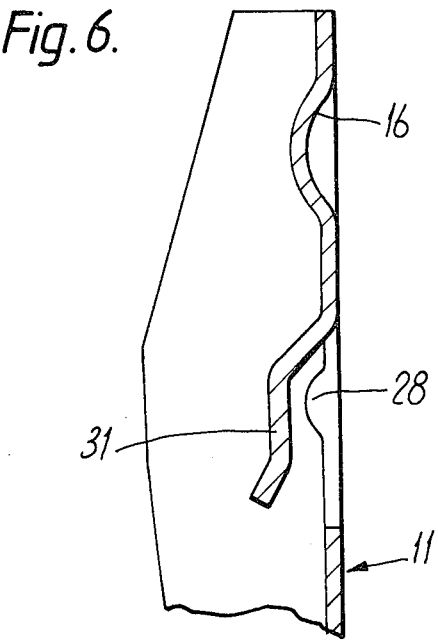
FIG. 6 is an enlarged detail of FIG. 2.
Figure 7:
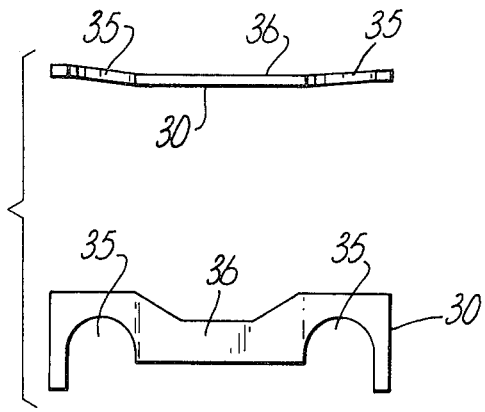
FIG. 7 is an end and top view of the retaining spring illustrated in FIGS. 2 and 3.

In FIG. 7 a retaining spring 30 is illustrated which has semi-circular clearances 35 and which according to FIGS. 2 and 3 is slid under and engages heads 29 of actuating pins 12 by means of clearances 35. The mid portion 36 of spring 30 is gripped behind a punched tongue 31 of control lever 11, the tongue 31 being illustrated in FIGS. 3 and 6, so as to ensure that retaining spring 30 will keep actuating pins 12 with their heads 29 in permanent abutment with dents 28.

A control force acting on actuating arm 11' of control lever 11 will be distributed evenly by lever 11 to the two control pistons 13. The share of the control force transmitted to the two control pistons 13, which ought to be of the same, determine the change-over points of the two control units. Due to the completely symmetrical arrangement, the change-over points of the two control units will be at the same pressure value.

Due to the effect of spherical joint 15, control lever 11 will remain in firm abutment at heads 29 of actuating pins 12 even if the penetration depths of control pistons 13 in the associated cylinders 32 are varying to a certain extent.

Figure 8:
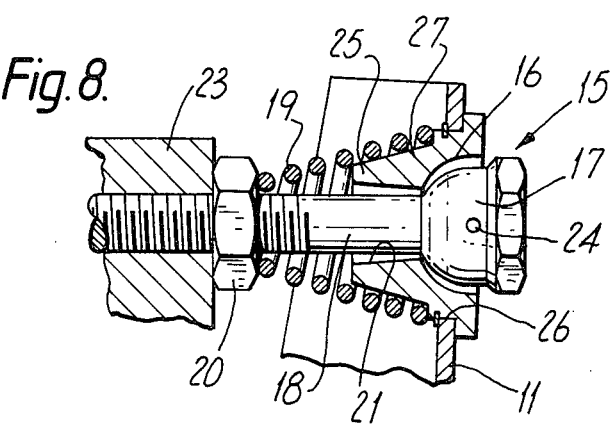
FIG. 8 is a cross sectional view of a modification of FIG. 2.
Figure 9:
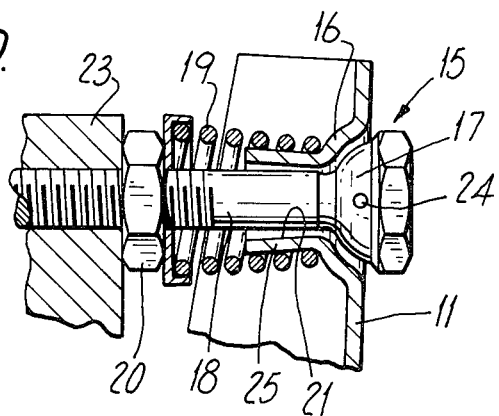
FIG. 9 is a cross sectional view of a variation of the modification of FIG. 8.

The tilting of control lever 11 around its longitudinal axis 14 could in principle be limited by a corresponding oval design of bore 21. However, in accordance with FIGS. 8 and 9, it is preferred that this limiting be effected by having a hollow shaft 25 follow the spherical calotte-like recess 16 towards housing 23, shaft 25 either, in accordance with FIG. 9, being formed together with metal lever 11 from the same material, or by a piece 27 inserted in a bore 26 of control lever 11. As can be seen from FIGS. 8 and 9, between shaft 25 and the cylindrical outer surface of bolt 18, there is a space which is conically expanding towards housing 23 and which, in correspondence with the conical form, is limiting the tilting angle of lever 11 around longitudinal axis 14. The tilting angle around the lateral axis 24, on the contrary, shall be great enough to ensure that the entire working range required for operation may be covered without any difficulties.

The limiting of the tilting angle around the longitudinal axis 14 is provided for in the event of failure of one brake circuit. As is known, in that case the associated control piston will remain in its rest position. Thanks to the tilting movement being limited, the change-over point in the still intact brake circuit essentially will be doubled.

According to FIGS. 1 through 3, control lever 11 is essentially U-shaped, the sides 11" essentially covering those components of the control unit which are protruding from cylinders 32.

The illustrated control lever permits manufacture of all points of application of force in one operation by one tool. Thus, despite economic manufacture there will be no tolerance and adjusting problems.

Figure 4:
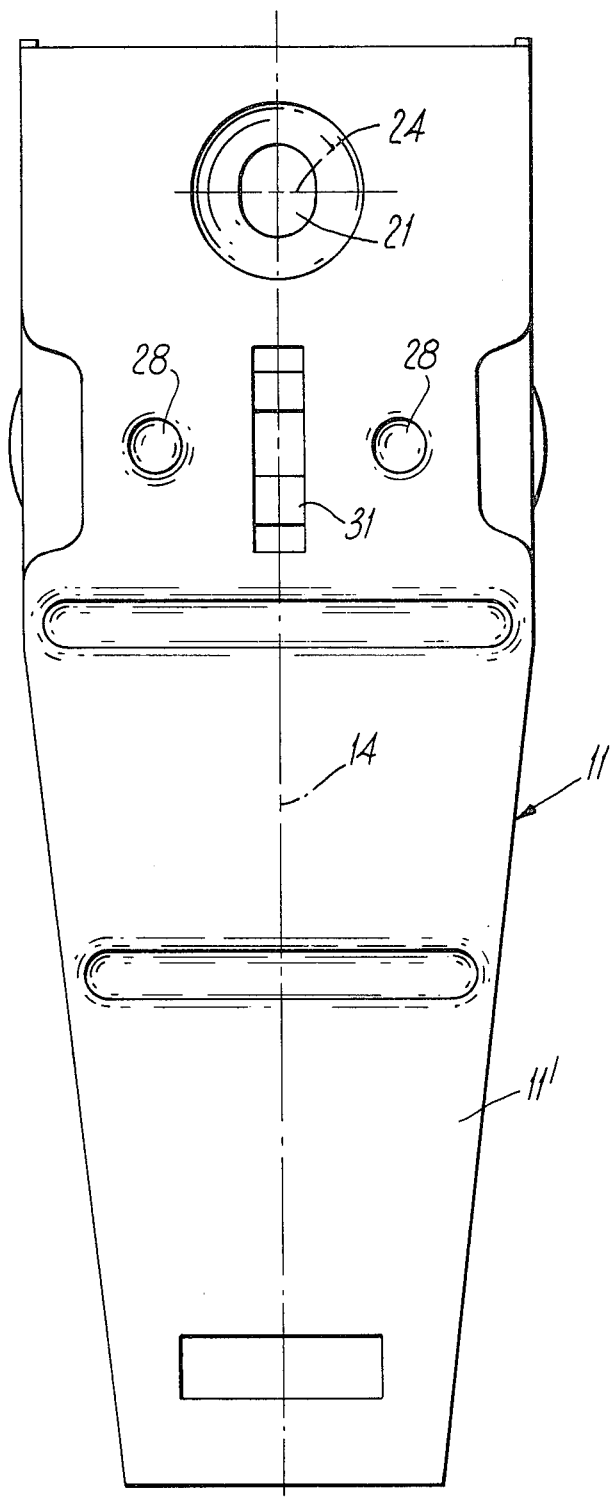
FIG. 4 is a back view of the inventive control lever of FIG. 2.
Figure 10:
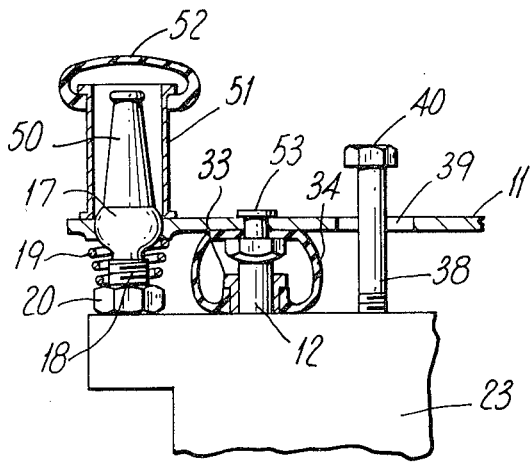
FIG. 10 is a cross sectional view of a second modification of FIG. 2.

According to FIG. 10, remote from bolt 18, a guiding pin 38 is arranged at housing 23. Guiding pin 38 passes through a hole 39 in lever 11 and has a stop head 40 so as to limit the tilting area of lever 11 around its lateral axis 24. Guiding pin 38 may be a simple bolt as represented. If hole 39 is an elongated hole whose longitudinal axis will coincide with the longitudinal axis 14 of (see FIG. 4) lever 11 and whose lateral axis will only slightly surpass the diameter of guiding pin 38, or the bolt used for this purpose, then, on the one hand, the direction of longitudinal axis 14 of lever 11 will be fixed with respect to housing 23. On the other hand, elongated hole 39 will limit the tilting area upon a tilting of the lever 11 around its longitudinal axis 14. Further, bolt 18 may carry a conical extension 50 on its head 17, extension 50 cooperating with a shaft 51 arranged at lever 11. Shaft 51 may have an elliptical cross-section at its opening which is spaced from lever 11. Thus, lever 11 may be tilted around its lateral axis 24 through a relatively large angle, while it may be tilted around its longitudinal axis 14 through only a relatively small angle. A sealing calotte 52 seals the opening of shaft 51 which is spaced from lever 11 against dirt accumulation.

In the embodiment according to FIG. 10, pressure members 53 will actuate actuating pins 12 of control pistons 13 pressure members 53 being fastened in a corresponding bore in lever 11. In this arrangement, sealing collar 34 is positioned between the end of housing 33 and a front face of pressure member 53. Thus, the space between housing 23 and pressure member 53 is sealed against the outside.

Figure 11:
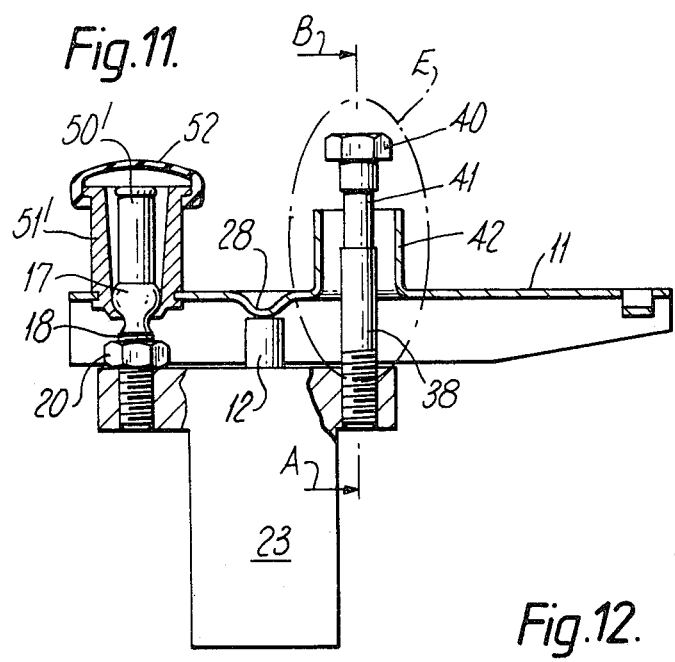
FIG. 11 is a cross sectional view of a variation of FIG. 10.
Figure 12:
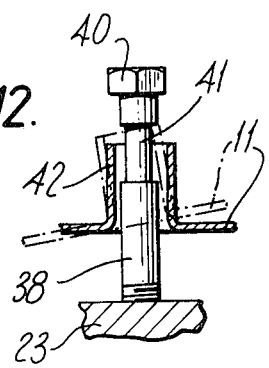
FIG. 12 is a cross sectional view of a detail E of FIG. 11 taken along line A-B in FIG. 11.

According to FIGS. 11 and 12, guiding pin 38 may have an annular groove 41 at a distance with respect to stop head 40. Annular groove 41 and guiding pin 38 will partially be enclosed by a sleeve 42 which is formed out of lever 11. In the rest position of lever 11 in which the control valves are open, the opening of sleeve 42 which is spaced from lever 11 will lie between the annular edges of groove 41. If lever 11 is tilted around its longitudinal axis 14 upon failure of one brake circuit, sleeve 42 will tilt in annular groove 41 as illustrated by the broken lines in FIG. 12. Thus, a tilting movement of lever 11 around its lateral axis 24 will be prevented, and, consequently, the pressure control valve of the intact brake circuit is permanently kept open.

FIG. 11 is a variation of the modification of FIG. 10 in which shaft 51' will have an opening which is conically expanding, while extension 50' of head 17 is cylindrical. In this arrangement, shaft 51' and extension 50' will cooperate to the effect that they will limit the tilting movements of lever 11 around its longitudinal and lateral axes.

According to FIG. 13, lever 11 may have lateral hooks 43 extending on both sides of lever 11 over the entire length thereof or arranged in spots along longitudinal axis 14 of lever 11, which are displaced with respect to the latter's suspension point at head 17 of bolt 18. These hooks 43 will cooperate with clearances or grooves 44 at housing 23 so as to cause lever 11 to be locked against tilting around its lateral axis 24 upon tilting around its longitudinal axis 14. Thus, again, upon failure of one brake circuit the pressure control valve of the intact brake circuit will be permanently open.

FIG. 14 shows a further way of limiting the tilting area of lever 11 around its longitudinal axis 14. In this arrangement, lever 11 has an articulated axle 45' with a double conical cross-section, the articulated axle 45' being provided at the end of lever 11 spaced from actuating arm 11' and running parallel to lateral axis 24 of lever 11. The tapered ends of articulated axle 45' are fastened a sides 11" of lever 11. The articulated axle 45' is supported in a bore 46' of housing 23. Bore 46' has a constant diameter which approximately corresponds to the maximum diameter of articulated axle 45'. Thus, articulated axle 45' may be tilted with respect to the axis of bore 46', and consequently, lever 11 will have a corresponding tilting area around its longitudinal axis 14.

In FIG. 15, articulated axle 45 has a constant diameter while bore 46 is expanding from its middle in a double conical manner. Here, also, articulated axle 45 may be tilted in bore 46. Thus, lever 11 is tiltable around its longitudinal axis 14 through an angle which corresponds to the conical form.

Figure 16:
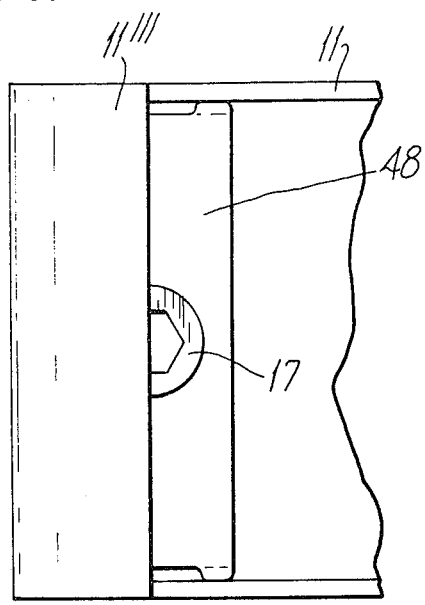
FIG. 16 is a top view of the control lever in the area of its joint.
Figure 17:
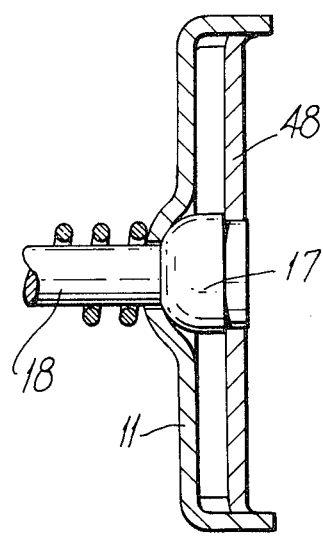
FIG. 17 is a cross sectional view parallel to the lateral axis of the control lever through the joint of the lever.
Figure 18:
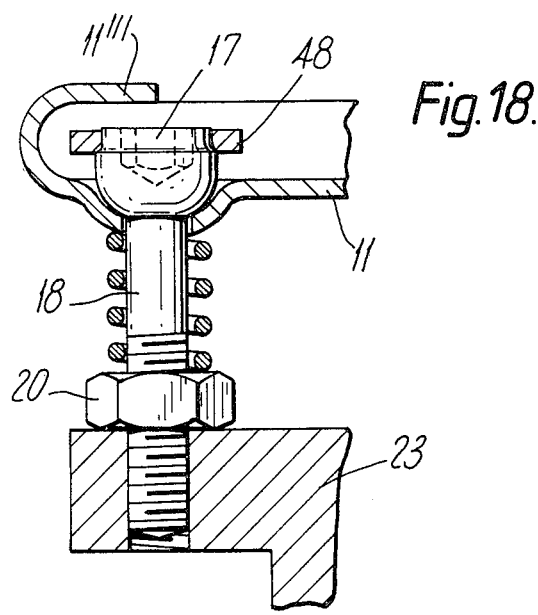
FIG. 18 is a longitudinal cross sectional view taken through the joint illustrated in FIG. 16.

FIGS. 16 through 18 show a further way of limiting the tilting area of lever 11 around its longitudinal axis 14. In this arrangement, a plate 48 is provided at head 17 of bolt 18, a given distance being maintained with respect to the top surface of lever 11 which is spaced from housing 23. Plate 48 may be rigid or resilient. Upon a tilting of lever 11 around its longitudinal axis 14, the ends of plate 48 will act on the top surface of lever 11 and will prevent any further tilting. Additionally, a rim 11''' of lever 11 may be bent around plate 48, a given distance being maintained with respect thereto. Thus, upon a tilting of lever 11 around its longitudinal axis 14, plate 48 will also cooperate with this rim 11''' to prevent further tilting.

While we have described above the principles of our invention in connection with specific apparatus it is to be clearly understood that this description is made only by way of example and not as a limitation to the scope of our invention as set forth in the objects thereof and in the accompanying claims.

We claim:

1. A two-circuit pressure control unit having a change-over point which is externally adjusted, said unit being employed in a two-circuit hydraulic brake system comprising:
   a housing containing two blind end bores having parallel longitudinal axes, each of said bores containing therein a control piston having an actuating pin projecting therefrom out of an associated one of said bores, each of said control pistons being associated with a different one of said two brake circuits; and
   a common control lever having a control force acting on one end thereof directly acting on both of said actuating pins for even distribution of said control force to said control pistons, said control lever being supported by said housing at a point spaced from said actuating pins to enable tilting of said control lever about a first axis corresponding to its longitudinal axis and a second axis perpendicular to said first axis at said point.

2. A control unit according to claim 1, wherein said control lever is supported by said housing at the other end thereof in a spherical joint.

3. A control unit according to claim 2, wherein said spherical joint includes a spherical calotte-like recess in said lever having a central bore therein and a bolt passing through said central bore and secured in said housing, said bolt having a head with a configuration complementary with respect to said recess fitting in said recess.

4. A control unit according to claim 3, wherein said bolt is screwed into said housing and is secured against twisting by a lock nut screwed into said bolt and bearing against said housing.

5. A control unit according to claim 4, further including
   a helical spring encircling said bolt having one end associated with said control lever and the other end associated with a selected one of said housing and said lock nut.

6. A control unit according to claim 5, further including
   stop means associated with said control lever and said bolt to limit said tilting of said control lever around said first axis without obstructing said tilting around said second axis.

7. A control unit according to claim 6, wherein said stop means include a hollow shaft extending from said control lever and encircling said bolt and said head, the inner surface of said shaft and the outer surface of said bolt being spaced by a distance that increases from said head toward said housing.

8. A control unit according to claim 7, wherein said shaft is integral with said control lever.

9. A control unit according to claim 7, wherein said shaft is a member inserted through an opening in said control lever and contains said recess.

10. A control unit according to claim 7, wherein said control lever includes two dents disposed side by side each abutting an adjacent end of a different one of said actuating pins.

11. A control unit according to claim 10, wherein each of said actuating pins has an annular groove therein adjacent said lever engaged by a common retaining spring supported by said control lever to maintain said actuating pins in abutment with said control lever.

12. A control unit according to claim 11, wherein said control lever includes a tab to grip said retaining spring.

13. A control unit according to claim 12, wherein said control lever has a U-shaped cross-section with the sides thereof covering said actuating pins projecting from said bores.

14. A control unit according to claim 13, further including
a guiding pin extending through an elongated hole in said control lever spaced from said spherical joint and fastened to said housing, said elongated hole having its major diameter coincident with said first axis, and said guiding pin having a stop head to ensure that said control lever is fixed with respect to said first axis and will be limited with regard to said tilting around said second axis.

15. A control unit according to claim 14, wherein said guiding pin includes an annular groove spaced a given distance from said stop head, and
said control lever includes a hollow sleeve disposed about said elongated hole extending from a surface thereof remote from said housing, said sleeve enclosing said guiding pin and engaging said annular groove upon a tilting of said control lever around said first axis to prevent said control lever tilting around said second axis.

16. A control unit according to claim 13, further including
inwardly extending hooks disposed along both sides of said control lever to engage grooves disposed in said housing when said control lever is tilted around said first axis to prevent tilting of said control lever around said second axis.

17. A control unit according to claim 6, wherein said stop means includes a plate fastened to said head disposed in spaced relation to and parallel to said control lever to limit tilting of said control lever around said first axis.

18. A control unit according to claim 17, wherein said control lever includes a rim disposed above and spaced from said plate.

19. A control unit according to claim 18, wherein said plate is made of a resilient material.

20. A control unit according to claim 1, wherein said control lever is supported by said housing at the other end thereof by a constant diameter articulated axle fastened to said control lever parallel to said second axis and supported in a double conical bore disposed in said housing to enable said tilting, said bore being closely adjacent said axle in the center thereof and expanding in a conical manner from the center to the ends thereof.

21. A control unit according to claim 1, wherein said control lever is supported by said housing at the other end thereof by a double conical articulated axle fastened to said control lever parallel to said second axis and supported in a constant diameter bore disposed in said housing to enable said tilting, said axle having its largest diameter in the center thereof and its smallest diameter at the ends thereof.

22. A control unit according to claim 1, wherein said control lever includes two dents disposed side by side each abutting an adjacent end of a different one of said actuating pins.

23. A control unit according to claim 22, wherein each of said actuating pins has an annular groove therein adjacent said lever engaged by a common retaining spring supported by said control lever to maintain said actuating pins in abutment with said control lever.

24. A control unit according to claim 23, wherein said control lever includes a tab to grip said retaining spring.

25. A control unit according to claim 24, wherein said control lever has a U-shaped cross-section with the sides thereof covering said actuating pins projecting from said bores.

26. A control unit according to claim 25, further including
a guiding pin extending through an elongated hole in said control lever spaced from said spherical joint and fastened to said housing, said elongated hole having its major diameter coincident with said first axis, and said guiding pin having a stop head to ensure that said control lever is fixed with respect to said first axis and will be limited with regard to said tilting around said second axis.

27. A control unit according to claim 26, wherein said guiding pin includes an annular groove spaced a given distance from said stop head, and
said control lever includes a hollow sleeve disposed about said elongated hole extending from a surface thereof remote from said housing, said sleeve enclosing said guiding pin and engaging said annular groove upon a tilting of said control lever around said first axis to prevent said control lever tilting around said second axis.

28. A control unit according to claim 25, further including
inwardly extending hooks disposed along both sides of said control lever to engage grooves disposed in said housing when said control lever is tilted around said first axis to prevent tilting of said control lever around said second axis.

29. A control unit according to claim 1, wherein said control lever has a U-shaped cross-section with the sides thereof covering said actuating pins projecting from said bores.

30. A control unit according to claim 29, further including
a guiding pin extending through an elongated hole in said control lever spaced from said spherical joint and fastened to said housing, said elongated hole having its major diameter coincident with said first axis, and said guiding pin having a stop head to ensure that said control lever is fixed with respect to said first axis and will be limited with regard to said tilting around said second axis.

31. A control unit according to claim 30, wherein
said guiding pin includes an annular groove spaced a given distance from said stop head, and
said control lever includes a hollow sleeve disposed about said elongated hole extending from a surface thereof remote from said housing, said sleeve enclosing said guiding pin and engaging said annular groove upon a tilting of said control lever around said first axis to prevent said control lever tilting around said second axis.

32. A control unit according to claim 31, further including
inwardly extending hooks disposed along both sides of said control lever to engage grooves disposed in said housing when said control lever is tilted around said first axis to prevent tilting of said control lever around said second axis.

33. A control unit according to claim 1, further including
a guiding pin extending through an elongated hole in said control lever spaced from said spherical joint and fastened to said housing, said elongated hole having its major diameter coincident with said first axis, and said guiding pin having a stop head to ensure that said control lever is fixed with respect to said first axis and will be limited with regard to said tilting around said second axis.

34. A control unit according to claim 33, wherein
said guiding pin includes an annular groove spaced a given distance from said stop head, and
said control lever includes a hollow sleeve disposed about said elongated hole extending from a surface thereof remote from said housing, said sleeve enclosing said guiding pin and engaging said annular groove upon a tilting of said control lever around said first axis to prevent said control lever tilting around said second axis.

35. A control unit according to claim 34, further including
inwardly extending hooks disposed along both sides of said control lever to engage grooves disposed in said housing when said control lever is tilted around said first axis to prevent tilting of said control lever around said second axis.

36. A control unit according to claim 1, further including
inwardly extending hooks disposed along both sides of said control lever to engage grooves disposed in said housing when said control lever is tilted around said first axis to prevent tilting of said control lever around said second axis.

* * * * *